Feb. 9, 1965  J. A. ZURBRIGEN ETAL  3,168,908
MECHANISM FOR THE INTERNAL SEALING OF A PIPE LEAK
Filed April 1, 1959
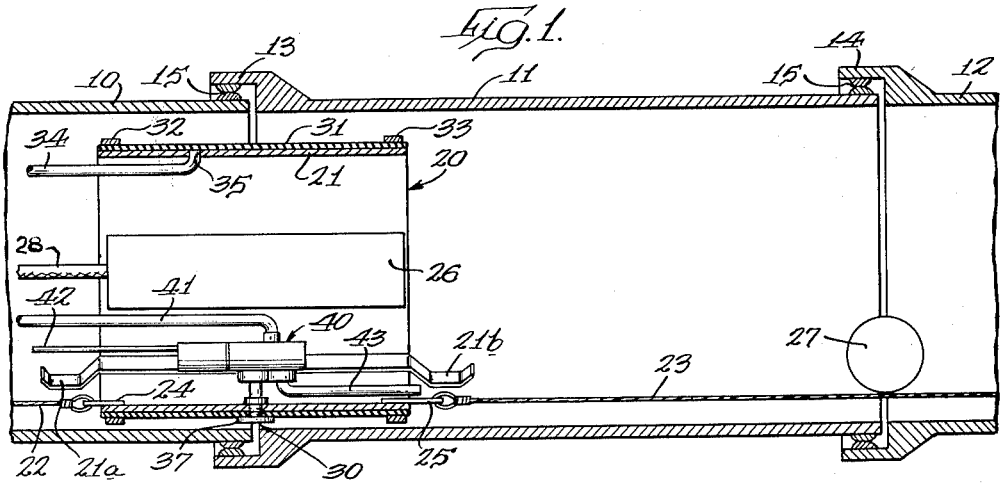
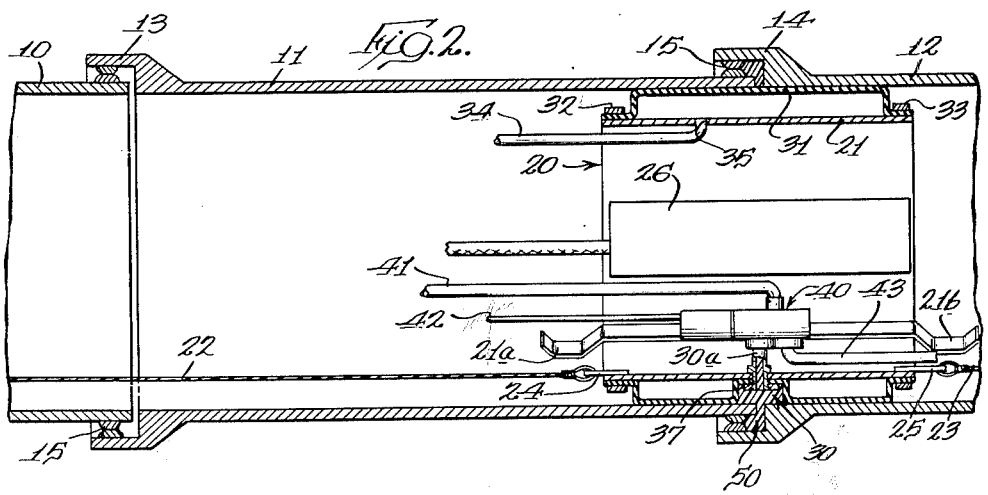
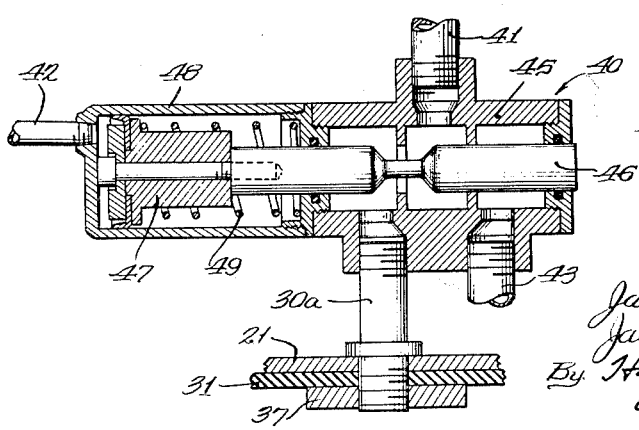
INVENTORS.
James A. Zurbrigen
Jack C. Steinsberger
By Hofgren, Brady, Wegner,
Allen & Stellman United States Patent Office 3,168,908
Patented Feb. 9, 1965

3,168,908
MECHANISM FOR THE INTERNAL SEALING OF A PIPE LEAK
James A. Zurbrigen, Evanston, and Jack C. Steinsberger, Highland Park, Ill., assignors, by mesne assignments, to The Penetryn System, Inc., Cleveland, Ohio, a corporation of Ohio
Filed Apr. 1, 1959, Ser. No. 803,442
2 Claims. (Cl. 138—97)

This invention relates to mechanism for the internal sealing of a pipe leak.

Frequently a pipe such as a sewer pipe develops leaks, particularly at the joints between sections. Prior to this invention the leak was located, one or more holes were drilled down to the joint where the leak occurred and the joint was filled with material such as cement from the exterior of the pipe. This has been an expensive and complicated solution to the problem as compared to the invention disclosed herein, in which the detection of the leak and the plugging of the leak are accomplished internally of the pipe without any exterior holes drilled down to the pipe joint.

The principal object of the invention is to provide mechanism for internally sealing a pipe leak comprising a packer movable within the pipe along the length thereof, means on the packer for injecting a leak plugging material into the leak, including injection means positionable adjacent the leak, and means on the packer for isolating the area of the pipe having the leak from the remainder of the pipe including an inflatable skin on the packer movable under fluid pressure radially outward into circumferential contact with the pipe at either side of the injection point.

The invention is illustrated in the accompanying drawings in which:

FIG. 1 is a vertical section through a pipe and the sealing mechanism with the sealing mechanism shown diagrammatically;

FIG. 2 is a view similar to FIG. 1 showing the sealing mechanism at the leak; and FIG. 3 is a diagrammatic vertical section on an enlarged scale of a valve mechanism carried by the sealing mechanism.

As shown in the drawings, a length of pipe such as a sewer pipe is composed of pipe sections 10, 11 and 12 which interfit at joints 13 and 14. Normally these joints are sealed in a suitable manner such as by a packing 15; however, leaks can develop in them. When the pipe is disposed in certain types of soil or locations, water can seep or leak into the pipe through an inadequately sealed joint between pipe sections.

In order to seal the leaking pipe joint, a packer, indicated generally in FIGS. 1 and 2, is provided. The packer 20 embodies a generally cylindrical casing 21 of a size somewhat less than the pipe's interior diameter so as to be movable within the pipe. The packer has tow cables 22 and 23 connected to opposite ends of the casing through connectors 24 and 25 attached to the casing. The cables extend along the pipe and pass upwardly to above the surface of the ground at spaced locations, whereby one cable may be paid out and the other taken in to result in movement of the packer along the pipe. The packer has spaced pairs of skids 21a and 21b which support the packer for sliding movement.

Means are provided for detecting a leak in the pipe comprising a commercially available closed circuit television system in which a television camera 26 and associated lights are carried by the packer casing 21 with the camera directed toward a position indicator 27 in the form of a ball attached to cable 23 a fixed distance ahead of the packer 20. The television cable 28 extending therefrom leads to an operator's location above ground where a television receiver indicates to an operator the condition of the pipe interior as seen by the camera 26. It will thus be seen that as the cables 22 and 23 are operated to move the packer 20 along the pipe, the camera 26 will detect the location of a leak and since the camera sights the ball 27, it is possible as a result of impingement of water on the ball 27 to locate the packer 20 in a position wherein the ball 27 is adjacent the leak.

The packer 20 has an injection point, indicated generally at 30, through which material may be injected into the leak for sealing. This injection point is a fixed distance from ball 27. Thus an operator, after the ball has been sighted at the leak, knows exactly the distance that the packer 20 must be advanced to place the injection point 30 over the leak in the position shown in FIG. 2.

The packer 20 has means for isolating the area having a leak from the remainder and this comprises an air impervious cylindrical skin 31, made of rubber or the like, which is clamped at its ends to the casing by rings 32 and 33. Means for directing compressed air between the casing 21 and the skin 31 includes a supply pipe 34 which extends through an opening 35 in the casing 21. As shown in FIG. 2, the expansion of the skin 31 results in contact with the inner periphery of the pipe and the skin readily adapts to out of round pipes as well as out of line joints.

A void forms in the skin at the injection point 30 when the skin is expanded and this is accomplished by the construction at the injection point 30. This construction includes an outlet pipe 30a passing through the casing 21 having an exterior end which is threaded and which extends beyond the skin 31. A plate 37 threads onto the end of the outlet pipe 30a and is of a diameter sufficient to hold a part of the skin against expansion. This plate is tightened sufficiently to maintain the air seal between the skin 31 and the exterior of the casing 21.

With the packer located and the skin 31 expanded as shown in FIG. 2, means provided for the purpose are employed to determine the acceptance of fluid through the leak. They comprise a valve indicated generally at 40 and a fluid line 41 leading from a position above ground. Water is directed to outlet pipe 30a and injection point 30 through the line 41 and valve 40. The line 41 and valve 40, along with the outlet pipe 30a and the injection point 30, also comprise means for injecting a leak plugging material into the pipe joint 14 after the test for fluid acceptance, this material being indicated at 50.

The leak plugging material is desirably one which is in a fluid state when initially mixed so that it can readily pass through the line 41 from above ground to the injection point 30 and then with a minimum amount of time will set to plug the leak in the pipe joint. One example of a suitable polymerizing material is the following, with the percentages by weight based on a full measure of water: (1) acrylamide methylene bis acrylamide—12% by weight, (2) ammonium persulfate—.5% by weight, (3) nitrilotrispropionamide—.8%, and the balance water. This mixture may also have an addition of clays or asbestos fibers or other miscellaneous fillers.

After plugging of the leak with the plugging material, the valve 40 holds the plugging material behind the injection point 30 until the plugging material has set. Thereafter the skin 31 is deflated by permitting the air to escape through the line 34. Water may then be forced through the line 41 and the valve 40 to blow the injection point 30 clean and the packer is then ready for the next leak.

A suitable valve is shown in FIG. 3 in which the lines 41 and 42 connect to a valve casing 45 and outlet lines 30a and 43 also connect to the casing. A valve stem 46 is movably mounted within the casing and when positioned as shown in FIG. 3 connects the line 41 to the injection point 30. The valve stem 46 may shift toward the right, blocking off outlet line 30a and connecting the line 41 with the outlet line 43.

The valve stem 46 is connected to a piston 47 mounted in a cylinder 48 and the piston is urged toward the left, as viewed in FIG. 3, by a spring 49 whereby the valve stem 46 is normally positioned as shown in the figure. When water or other liquid enters through the line 42, the piston 47 is shifted toward the right against the spring 49 to shift the valve stem 46 to the right and thus place the line 41 in communication with the outlet line 43 and close off the outlet line 30a to the injection point 30.

It is believed that from the foregoing description the method will be entirely clear; however, it may be briefly summarized as follows. The packer is drawn through the pipe with the cables 22 and 23 until a leak is observed by the camera 26, the position indicator is positioned at the leak, and the measurement is then taken. The packer is then moved ahead a distance equal to the distance between the position indicator and injection point 30 to locate the injection point 30 directly over the leak. Compressed air is then passed through the line 34 to expand the skin 31 into close contact with the pipe on either side of the leak.

After the skin is expanded, water is pumped through the line 41 and the valve 40 to the injection point 30 to determine the acceptance of fluid through the leak. After this is determined, a predetermined quantity of the plugging material is mixed and is passed through the line 41 and the valve 40 to the injection point 30. After sufficient material has been placed in the joint to seal the leak, the valve 40 is shifted by hydraulic pressure on the exposed face of the piston 47 and this causes the flow from line 41 to be wasted through outlet line 43. This holds the plugging material behind the injection point until the material sets.

After the material has set, the skin 31 is deflated by permitting the air to escape through the pipe 34. The valve 40 is then returned to its original position by releasing the hydraulic pressure in line 42 and water is forced through line 41 to the valve 40 to blow the injection means clean of the plugging material. The packer is then ready to be moved along the pipe to detect and seal the next leak.

The foregoing detailed description is given for clearness of understanding and no unnecessary limitations should be understood therefrom, as modifications will be obvious to those skilled in the art.

We claim:

1. A pipe leak sealing mechanism comprising an open-ended cylindrical casing of a size less than the pipe, oppositely extending tow cables for drawing the casing through the pipe, an air impervious inflatable skin mounted on the casing exterior with the ends of the skin sealed to the ends of the casing, a conduit passing through an open end of the casing adapted to supply a fluid under pressure to the space between the casing and the skin, injection means passing through the casing and the skin intermediate the ends of the skin, said injection means producing a void between the skin and the interior of the pipe, and means for directing a settable sealant through said injection means whereby the sealant may flow into said void and thence into the pipe leak.

2. A pipe leak sealing meachanism comprising an open-ended cylindrical casing of a size less than the pipe, oppositely extending tow cables connected to the casing near the ends thereof for drawing the casing through the pipe, an air impervious inflatable skin mounted on the casing exterior with the ends of the skin sealed to the ends of the casing, a conduit passing through an open end of the casing adapted to supply a fluid under pressure to the space between the casing and the skin, injection means passing through the casing and the skin intermediate the ends of the skin, said injection means producing a void between the skin and the interior of the pipe, and means for directing a polymerizing chemical through said injection means whereby the chemical may flow into said void and thence into the pipe leak.

References Cited by the Examiner

UNITED STATES PATENTS

| 2,130,030 | 9/38 | Richardson | 138—93 |
|---|---|---|---|
| 2,441,894 | 5/48 | Mennecier | 166—100 |
| 2,619,728 | 12/52 | Ely. | |
| 2,632,801 | 3/53 | Donaldson. | |
| 2,812,697 | 11/57 | Laval | 33—205.5 XR |
| 2,837,122 | 6/58 | Shaw | 138—97 |
| 2,849,530 | 8/58 | Fleet | 178—6 XR |
| 2,908,248 | 10/59 | Brant | 138—97 XR |
| 2,917,085 | 12/59 | Douse | 138—97 |
| 2,933,024 | 4/60 | Baggs et al. | 88—14 XR |
| 2,971,259 | 2/61 | Hahnau et al. | 33—1 |

FOREIGN PATENTS

| 142,419 | 5/20 | Great Britain. |
|---|---|---|
| 212,715 | 3/24 | Great Britain. |
| 826,429 | 1/60 | Great Britain. |

EDWARD V. BENHAM, *Primary Examiner.*

LEWIS J. LENNY, ISAAC LISANN, *Examiners.*